United States Patent
Govil et al.

(10) Patent No.: US 11,011,068 B2
(45) Date of Patent: May 18, 2021

(54) SYSTEMS AND METHODS FOR AUTOMATED RESPONSE DATA SENSING-BASED NEXT CONTENT PRESENTATION

(71) Applicant: Pearson Education, Inc., New York, NY (US)

(72) Inventors: Vivek Govil, Wraysbury (GB); Wayne Press, Cape Town (ZA); Jennifer Walsh, Melbourne (AU)

(73) Assignee: PEARSON EDUCATION, INC., New York, NY (US)

( * ) Notice: Subject to any disclaimer, the term of this patent is extended or adjusted under 35 U.S.C. 154(b) by 360 days.

(21) Appl. No.: 15/933,174

(22) Filed: Mar. 22, 2018

(65) Prior Publication Data

US 2018/0286262 A1  Oct. 4, 2018

Related U.S. Application Data

(60) Provisional application No. 62/480,245, filed on Mar. 31, 2017.

(51) Int. Cl.
| | |
|---|---|
| *G09B 7/02* | (2006.01) |
| *G09B 5/08* | (2006.01) |
| *G06T 7/70* | (2017.01) |
| *G06T 1/00* | (2006.01) |
| *G09B 5/12* | (2006.01) |
| *G09B 7/07* | (2006.01) |

(Continued)

(52) U.S. Cl.
CPC .............. *G09B 7/02* (2013.01); *G06T 1/0007* (2013.01); *G06T 7/70* (2017.01); *G09B 5/08* (2013.01); *G09B 5/12* (2013.01); *G09B 7/07* (2013.01); *G09B 7/12* (2013.01); *G06T 2207/20092* (2013.01); *G06T 2207/30176* (2013.01); *G06T 2207/30196* (2013.01); *G09B 5/065* (2013.01)

(58) Field of Classification Search
CPC ..................... G06T 1/0007; G06T 7/70; G06T 2207/30196; G06T 2207/30176; G06T 2207/20092; G09B 5/12; G09B 7/12; G09B 7/07; G09B 7/02; G09B 5/08; G09B 5/065
See application file for complete search history.

(56) References Cited

U.S. PATENT DOCUMENTS

| | | |
|---|---|---|
| 2002/0164999 A1 | 11/2002 | Johnson |
| 2008/0261194 A1 | 10/2008 | Hilton |
| 2009/0077479 A1 | 3/2009 | Tucci |

(Continued)

*Primary Examiner* — Nathan Hillery
(74) *Attorney, Agent, or Firm* — Quarles & Brady LLP

(57) ABSTRACT

Systems and methods for automatic generation of a content presentation plan are disclosed herein. The method can include receiving content identification information, retrieving objective information for the one or several objectives identified for inclusion in a content presentation plan, identifying at least one prerequisite skill for completion of at least one of the one or several objectives, generating at least one remediation question configured to delineate between users having mastery of the at least one prerequisite skill and users not having mastery of the at least one prerequisite skill, pre-selecting remedial content for providing to users identified as not having mastery of the at least one prerequisite skill, selecting objective content corresponding to the at least one objectives, and creating a content presentation plan containing the at least one remediation question, the remedial content, and the objective content.

2 Claims, 12 Drawing Sheets

(51) Int. Cl.
*G09B 7/12* (2006.01)
*G09B 5/06* (2006.01)

(56) References Cited

U.S. PATENT DOCUMENTS

| | | |
|---|---|---|
| 2009/0087820 A1 | 4/2009 | Chandless |
| 2011/0091859 A1 | 4/2011 | Hall |
| 2014/0186810 A1 | 7/2014 | Falash et al. |
| 2015/0154879 A1 | 6/2015 | Poor et al. |
| 2016/0019799 A1 | 1/2016 | Hosang |

SYSTEMS AND METHODS FOR AUTOMATED RESPONSE DATA SENSING-BASED NEXT CONTENT PRESENTATION

CROSS-REFERENCES TO RELATED APPLICATIONS

This application claims the benefit of U.S. Provisional Application No. 62/480,245, filed on Mar. 31, 2017, and entitled "DYNAMIC CLASSROOMS", the entirety of which is hereby incorporated by reference herein.

BACKGROUND

A computer network or data network is a telecommunications network that allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology, and organizational intent. In most cases, communications protocols are layered on (i.e. work using) other more specific or more general communications protocols, except for the physical layer that directly deals with the transmission media.

Notifications can be sent through a computer network. These notifications can be electronic notification and can be receive via e-mail, phone, text message, or fax. Notifications have many applications for businesses, governments, schools, and individuals.

BRIEF SUMMARY

One aspect of the present disclosure relates to a system for automatic generation of a content delivery framework. The system includes: memory including: a plurality of objectives; and objective information for the plurality of objectives; and at least one processor. The at least one processor can: receive content identification information that identifies one or several objectives for inclusion in a content presentation plan; retrieve objective information for the one or several objectives identified for inclusion in a content presentation plan from the memory; identify at least one prerequisite skill for completion of the one or several objectives, which at least one prerequisite skill is identified in the objective information of the at least one objectives; generate at least one remediation question that can delineate between users having mastery of the at least one prerequisite skill and users not having mastery of the at least one prerequisite skill; pre-select remedial content for providing to users identified as not having mastery of the at least one prerequisite skill; select objective content corresponding to the at least one objectives, which content corresponding to the at least one objective includes multiple packets of presentation content and multiple packets of assessment content; and create a content presentation plan containing: the at least one remediation question, the remedial content, and the objective content. In some embodiments, the content presentation plan includes code that can direct the processor to deliver the objective content subsequent to the delivery of the remediation question. In some embodiments, the content presentation plan can include code that can direct the processor to iteratively deliver the objective content.

In some embodiments, the system includes a user device. In some embodiments, the user device includes the at least one processor. In some embodiments, the content presentation plan includes code configured to deliver the remediation content when the remediation question is incorrectly answered. In some embodiments, the at least one processor can download the at least one remediation question and the remedial content. In some embodiments, the at least one processor can download the objective content to the user device. In some embodiments, the at least one remediation question can include a plurality of questions. In some embodiments, each of the plurality of questions is associated with unique remedial content.

In some embodiments, the at least one processor can: receive a launch request; launch a presentation interface, which presentation interface includes a user interface that can provide the content presentation plan; and retrieve presentation data from the memory. In some embodiments, the at least one processor can: identify next content from the content presentation plan; and provide the identified next content to a user via the presentation interface.

In some embodiments, the system includes a sensor communicatingly coupled with the at least one processor. In some embodiments, the at least one processor can: sense response data with the sensor; evaluate sense response data; and determine to provide a remediation. In some embodiments, the at least one processor can determine a presence of a plan break. In some embodiments, when the presence of the plan break is determined, the at least one processor can: generate a remediation; generate at least one remediation cohort; and deliver the generated remediation to the remediation cohort.

One aspect of the present disclosure relates to a method for automatic generation of a content presentation plan. The method includes: receiving at a user device content identification information, which content identification information identifies one or several objectives for inclusion in a content presentation plan; retrieving objective information for the one or several objectives identified for inclusion in a content presentation plan from a database server, which database server includes objective information for a plurality of the objectives; identifying at least one prerequisite skill for completion of at least one of the one or several objectives, which at least one prerequisite skill is identified in the objective information of the at least one of the one or several objectives; generating at least one remediation question that can delineate between users having mastery of the at least one prerequisite skill and users not having mastery of the at least one prerequisite skill; pre-selecting remedial content for providing to users identified as not having mastery of the at least one prerequisite skill; selecting objective content corresponding to the at least one objectives, which content corresponding to the at least one objectives includes multiple packets of presentation content and multiple packets of assessment content; and creating a content presentation plan containing the at least one remediation question, the remedial content, and the objective content. In some embodiments, the content presentation plan includes code to cause the processor to deliver the objective content subsequent to the delivery of the remediation question. In some embodiments, the content presentation plan includes code that can iteratively deliver the objective content.

In some embodiments, the content presentation plan includes code that directs the server deliver the remediation content when the remediation question is incorrectly answered. In some embodiments, the method includes downloading the at least one remediation question and the remedial content to the user device. In some embodiments, the method includes downloading the objective content to the user device. In some embodiments, the at least one remediation question includes a plurality of questions, and each of the plurality of questions is associated with unique remedial content. In some embodiments, the method includes: receiving a launch request; launching a presentation interface, which presentation interface comprises a user interface configured to provide the content presentation plan; and retrieving presentation data from the memory.

In some embodiments, the method includes: identifying next content from the content presentation plan; and providing the identified next content to a user via the presentation interface. In some embodiments, the method includes: sensing response data with a sensor of the user device; evaluating sense response data; and determining to provide a remediation. In some embodiments, the method includes: determining presence of a plan break; when presence of the plan break is determined, the process including: generating a remediation; generating at least one remediation cohort; and delivering the generated remediation to the remediation cohort.

One aspect of the present disclosure relates to a system for automated response data sensing. The system includes: a memory; a sensor that can generate image data; and at least one processor. In some embodiments, the at least one processor can: provide next content to a user via a presentation interface; retrieve image data generated by the sensor; identify user indicia in the image data; generate a dataset of user indicia from the image data; identify indicated responses in the image data; and update the dataset to link user indicia and indicated responses.

In some embodiments, the at least one processor can extract the identified user indicia from the image data. In some embodiments, the at least one processor can extract the indicated responses from the image data. In some embodiments, at least some of the indicated responses are associated with user indicia in the image data. In some embodiments, the image data includes an image of a plurality of user cards.

In some embodiments, each of the plurality of user cards comprises: a user identifier and at least one orientation feature. In some embodiments, the at least one orientation feature is integrated with the user identifier. In some embodiments, the at least one orientation feature is distinct from the user identifier. In some embodiments, the indicated responses are extracted from the image data based on the orientation of user cards.

In some embodiments, the at least one processor can: evaluate sensed response data; determine to provide a remediation; and determine presence of a plan break. In some embodiments the at least on processor can, when presence of the plan break is determined: generate a remediation; generate at least one remediation cohort; and deliver the generated remediation to the remediation cohort.

One aspect of the present disclosure relates to a method for automated response data sensing. The method includes: providing next content to a user via a presentation interface of a user device; generating image data with a sensor of the user device; retrieving the image data from the sensor; identifying user indicia in the image data; generating a dataset of user indicia from the image data; identifying indicated responses in the image data; and updating the dataset to link user indicia and indicated responses.

In some embodiments, the method includes extracting the identified user indicia from the image data. In some embodiments, the method includes extracting the indicated response from the image data. In some embodiments, at least some of the indicated responses are associated with user indicia in the image data.

In some embodiments, the image data includes an image of a plurality of user cards. In some embodiments, each of the plurality of user cards includes: a user identifier and at least one orientation feature. In some embodiments, the at least one orientation feature is integrated with the user identifier. In some embodiments, the at least one orientation feature is distinct from the user identifier. In some embodiments, the indicated responses are extracted from the image data based on the orientation of user cards. In some embodiments, the method includes: evaluating sensed response data; determining to provide a remediation; determining presence of a plan break; and, when presence of the plan break is determined: generating a remediation; generating at least one remediation cohort; and delivering the generated remediation to the remediation cohort.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
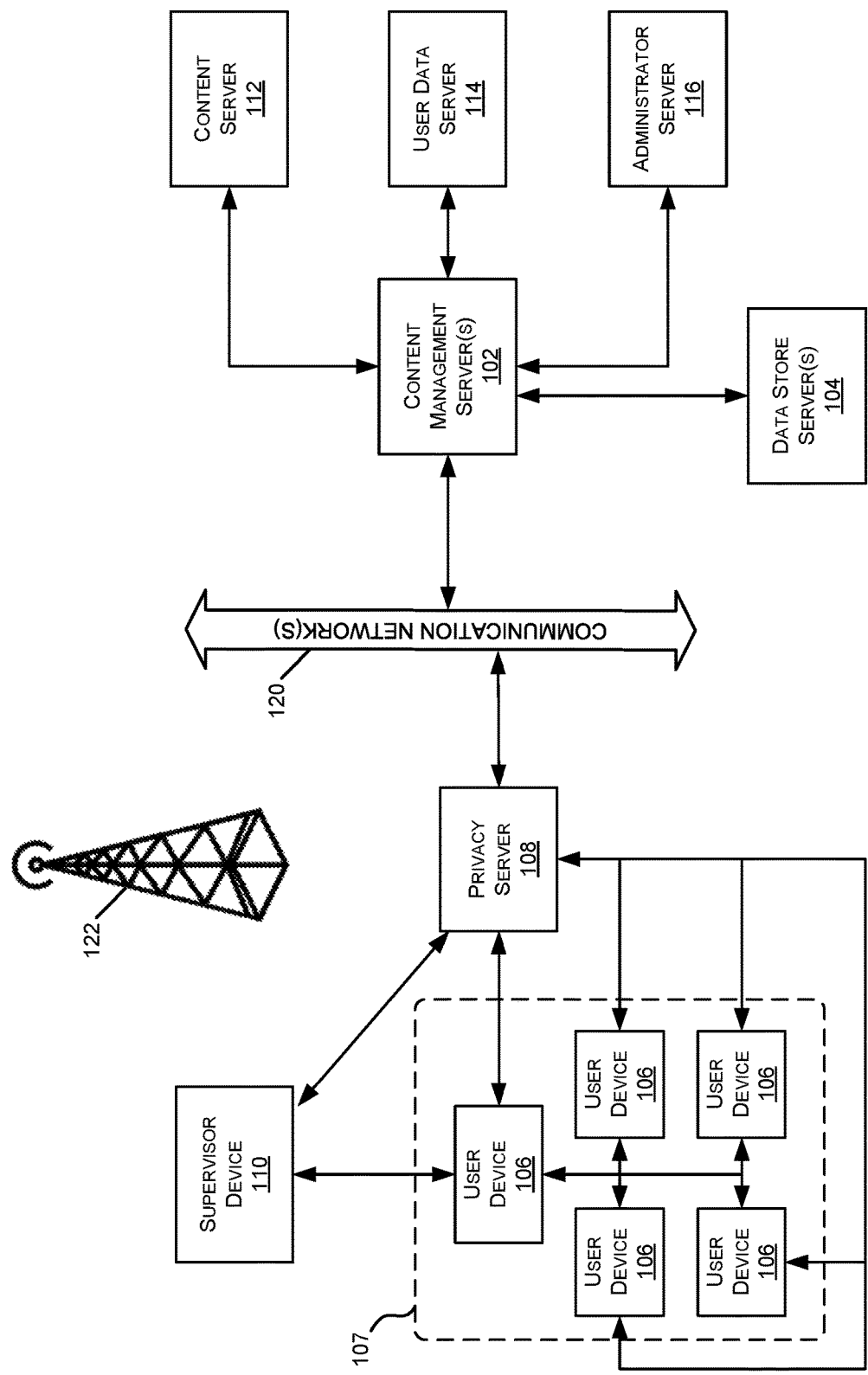
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
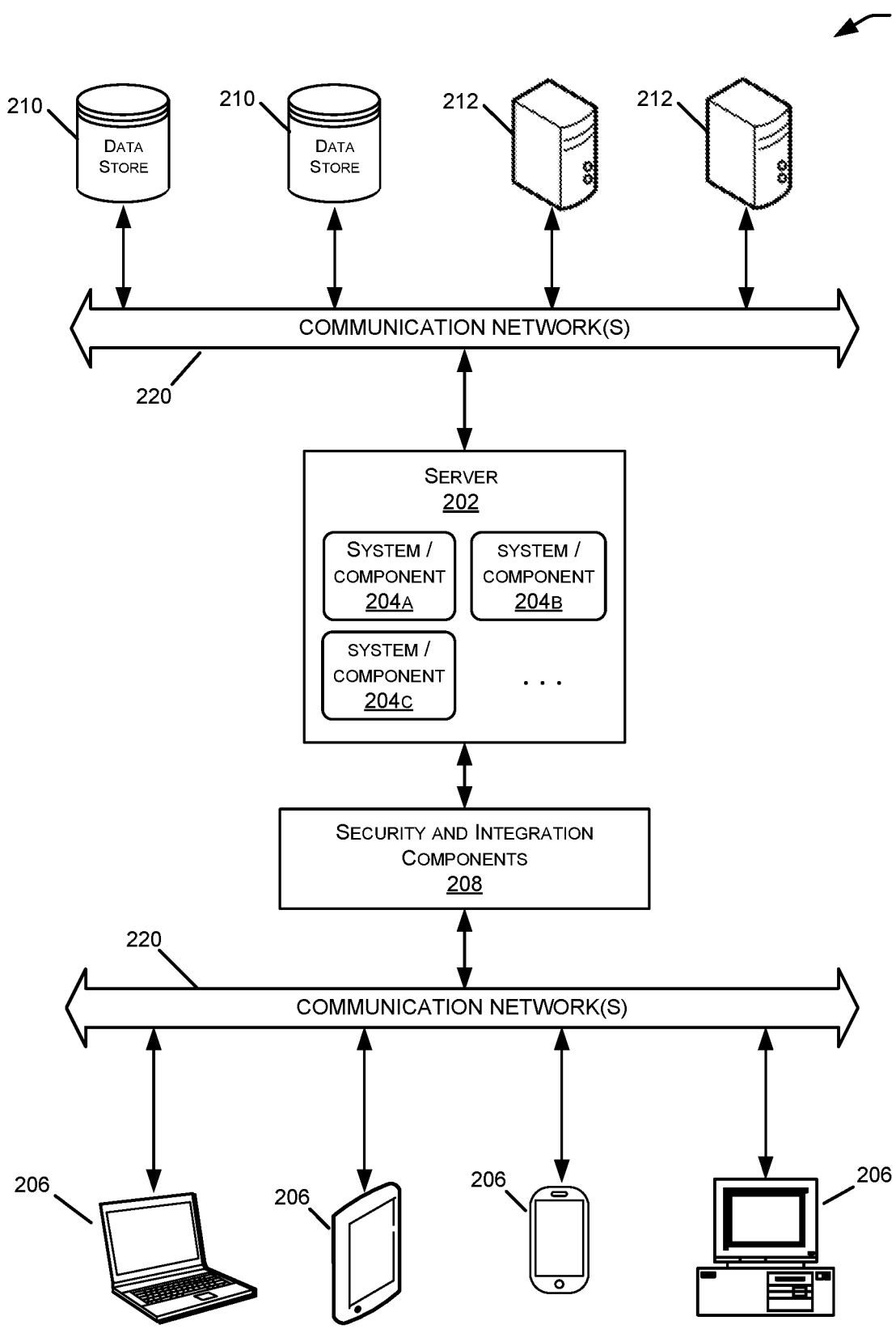
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
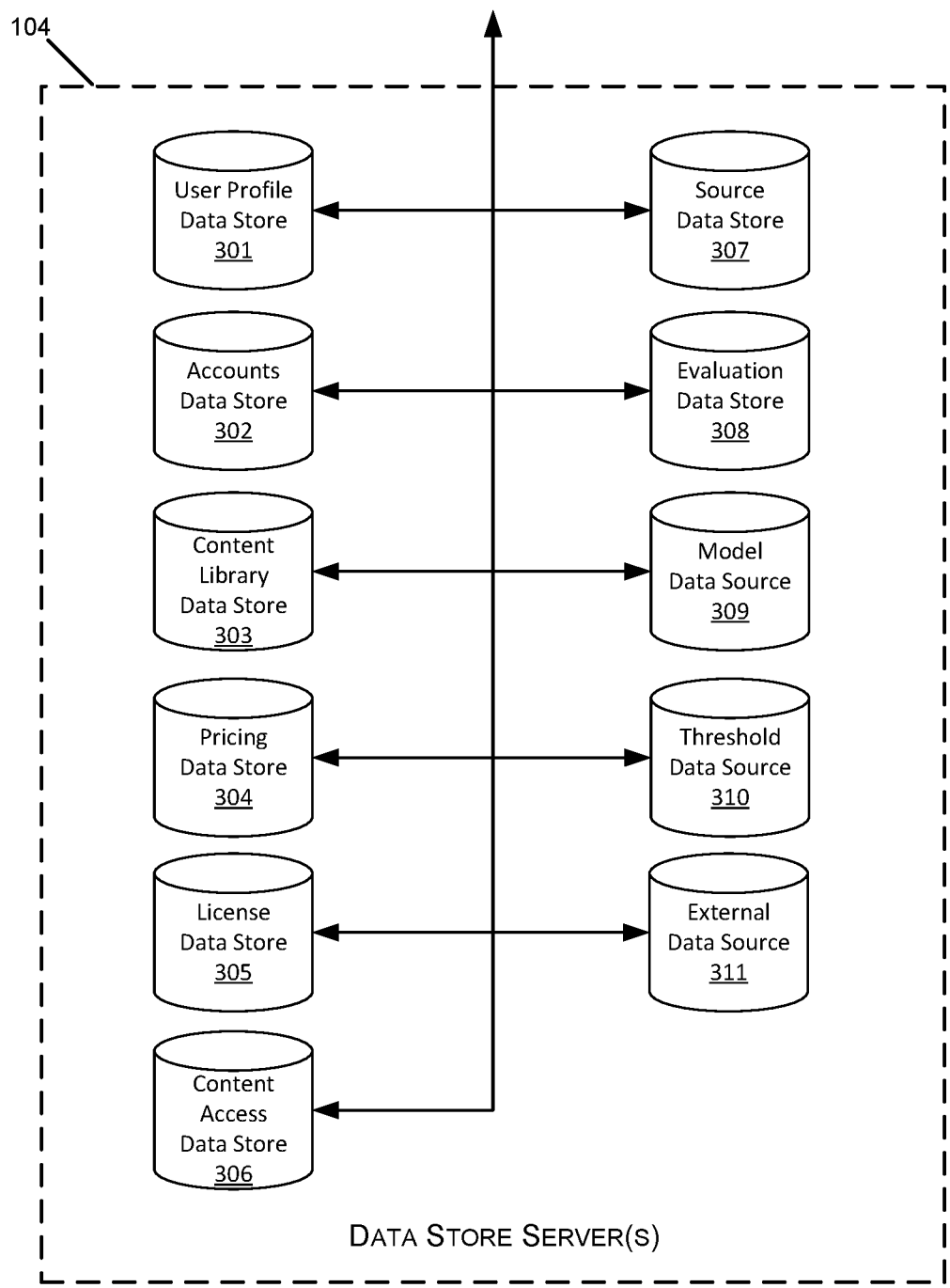
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors, also referred to herein as content presenters, who are responsible for organizing, presenting, and/or managing the presentation of information to the student. In some embodiments, user profile database 301 can include information identifying courses and/or subjects that have been taught by the content presenter, data identifying courses and/or subjects currently taught by the content presenter, and/or data identifying courses and/or subjects that will be taught by the content presenter. In some embodiments, this can include information relating to one or several teaching styles of one or several teachers. In some embodiments, the user profile database 301 can further include information indicating past evaluations and/or evaluation reports received by the content presenter. In some embodiments, the user profile database 301 can further include information relating to improvement suggestions received by the content presenter, training received by the content presenter, continuing education received by the content presenter, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be nodes or can correspond to nodes that are linked to form an object network. In some embodiments, these nodes can be linked in the object network according to one or several prerequisite relationships that can, for example, identify the relative hierarchy and/or difficulty of the data objects. The hierarchical relationship can identify one or several nodes as prerequisites to one or several other nodes. In some embodiments, for example, some or all of the nodes in the content network can have one or several linked prerequisite nodes.

In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library database 303 can include a plurality of content components. The content components can, in some embodiments, comprise one or several tasks, questions, activities, or the like that can be combined together to create a single piece of content, also referred to herein as a content aggregation or form, such as, for example, a single assignment, quiz, test, or evaluation. In some embodiments, these single content components can be each associated with information. This information can be generated from user interaction with the content of the single components. In some embodiments, this information can, for example, characterize a reliability of the single item, a difficult of the single item, a differentiation of the single item, one or several averages of the single item, one or several standard deviations of the single item, or the like. In some embodiments, the differentiation of the single item can characterize the degree to which correctly or incorrectly responding to the item delineates between skill levels, attribute levels, or the like. In some embodiments, information associated with single items can be used to determine a reliability of a combination of multiple items.

In some embodiments, the content library database 303 can comprise one or several forms that can each include a plurality content components. In some embodiments, these forms can be created by a user of the CDN 100 from the content components stored in the content library database 303. In some embodiments, some or all of these one or several forms can be characterized by, for example, one or several scores or statistical measures. These scores or statistical measures can include a reliability score such as, for example, a Cronbach's α, an error score or value such as, for example, a standard error of measurement (SEM) score, or the like. In some embodiments, one or several of these scores can be calculated based on the information associated with each of the content components. In some embodiments, these one or several scores of the form can be calculated in real-time and in some embodiments, one or several scores for alternative forms can be calculated to allow the recommendation of one or several content components for inclusion in the form and/or for removal from the form. In some embodiments, these one or several scores can vary based on one or several attributes of the intended recipient and/or recipients of the form. These one or several attributes can include, for example, gender, age, education, intelligence, or the like.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network are content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network can be organized according to the object network and/or the hierarchical relationships embodied in the object network. In some embodiments, the content aggregation network, and/or the content aggregations forming the content aggregation network can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold database 310, also referred to herein as a threshold database, can store one or several threshold values. These one or several threshold values can delineate between states or conditions. In one exemplary embodiments, for example, a threshold value can delineate between an acceptable user performance and an unacceptable user performance, between content appropriate for a user and content that is inappropriate for a user, between risk levels, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
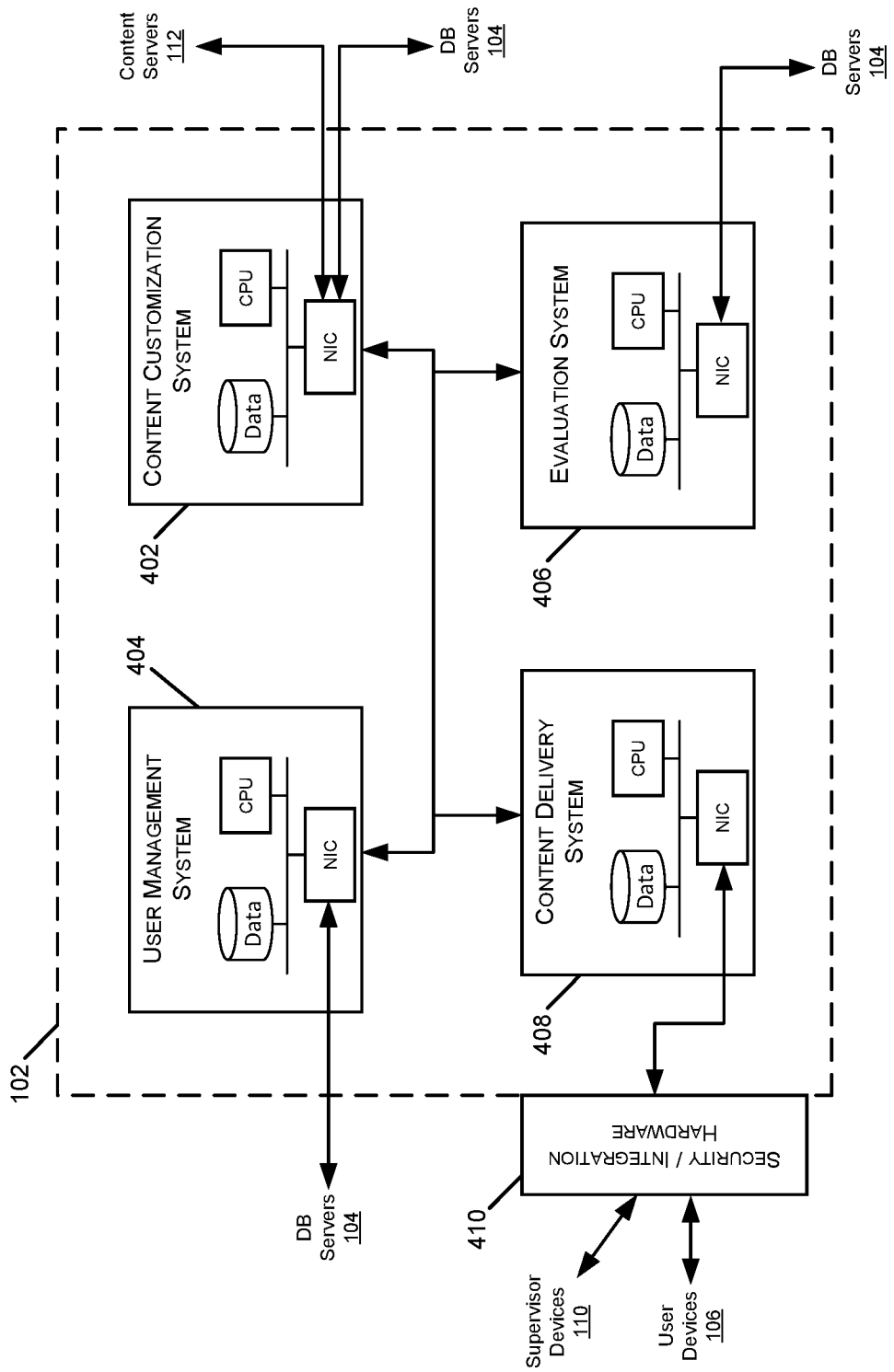
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; form reliability, content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 238 various data streams can be selected for archiving into the historical data store 334.

Components of the content distribution network 100 outside of the server 102 can also gather information that is reported to the server 102 in real-time, near real-time or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response but define an identifier of that user as a private variable that would not be passed to processing subscribers lacking access to that user and/or authorization to receive that user data. Processing subscribers having access to that user and/or authorization to receive that user data would receive the subscriber identifier along with response reported that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. Specifically, in some embodiments, the messaging bus 412 can receive and output information from at least one of the packet selection system, the presentation system, the response system, and the summary model system. In some embodiments, this information can be output according to a "push" model, and in some embodiments, this information can be output according to a "pull" model.

As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. In some embodiments, the internal processing subscriber 402-408 can receive a request for creation of a form, receive filter inputs from the user, provide content components corresponding to the filter inputs to the user, receive selections of content components for inclusion in the form, calculate a reliability of the form, generate recommended changes to the form, store the form, provide the form to a user, receive responses to the provided form, evaluate the responses, generate a score characterizing the received response, updating information relevant to the user, generating and providing an intervention or intervention recommendation, and providing the updated information relevant to the user.

The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users, and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets or content components, for providing to a user. In some embodiments, the recommendation engine can identify one or several content components for removal from a form and/or one or several content components for inclusion in a form. In some embodiments, these on or several content components can be identified based on their impact on the one or several scores or statistical measures characterizing the form.

In some embodiments, for example, the reliability of a form may be too low as compared to a threshold value. In such an embodiment, one or several content components in the form that are responsible for decreasing the reliability of the form can be identified for removal from the form and/or can be removed from the form. Similarly, in some embodiments in which the reliability is too low, one or several content components that are not in the form can be identified for inclusion in the form and/or can be included in the form. In some embodiments, one or several content components identified for inclusion in the form and/or identified for removal from the form can be identified to the creator of the form for confirmation of the removal of those one or several content components from the form and/or for the confirmation of the addition of those one or several content components to the form.

These content components can be selected based on, for example, the information retrieved from the database server 104 including, for example, the user profile database 301, the content library database 303, the model database 309, or the like. In some embodiments, these one or several data packets can be adaptively selected and/or selected according to one or several selection rules, to the determine reliability of a form or draft form, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses or curriculums in training or educational contexts, interactive gaming environments, and the like. For example, the summary model system 404 may query one or more databases and/or data store servers 104 to retrieve user data such as associated content compilations or programs, content completion status, user goals, results, and the like. In some embodiments, the summary model system 404 can generate a model, based on user response data, identifying a user's progress over time in developing a skill, an attribute, or the like. In some embodiments, this can include receiving a raw score generated by, for example, the response system 406 (discussed below), and generating a standardized score from that raw score. In some embodiments, for example, this can include the generation of a T-score from the raw score. In some embodiments, the T-score can be a standardized score that is positive and that has a mean of 50. In some embodiments, the T-score can characterize the number of standard deviations a raw score is above or below a mean. In some embodiments, the T-score can be used to standardize for age, gender, or any other attribute.

A content management server 102 also may include an response system 406, which can include, in some embodiments, a response processor. The response system 406 may be implemented using dedicated hardware within the content distribution network 100 (e.g., a response server 406), or using designated hardware and software resources within a shared content management server 102.

The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100.

The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several responses into one or several observables can include determining whether the one or several responses are correct responses, also referred to herein as desired responses, or are incorrect responses, also referred to herein as undesired responses. In some embodiments, the translation of the one or several responses into one or several observables can include characterizing the degree to which one or several responses are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
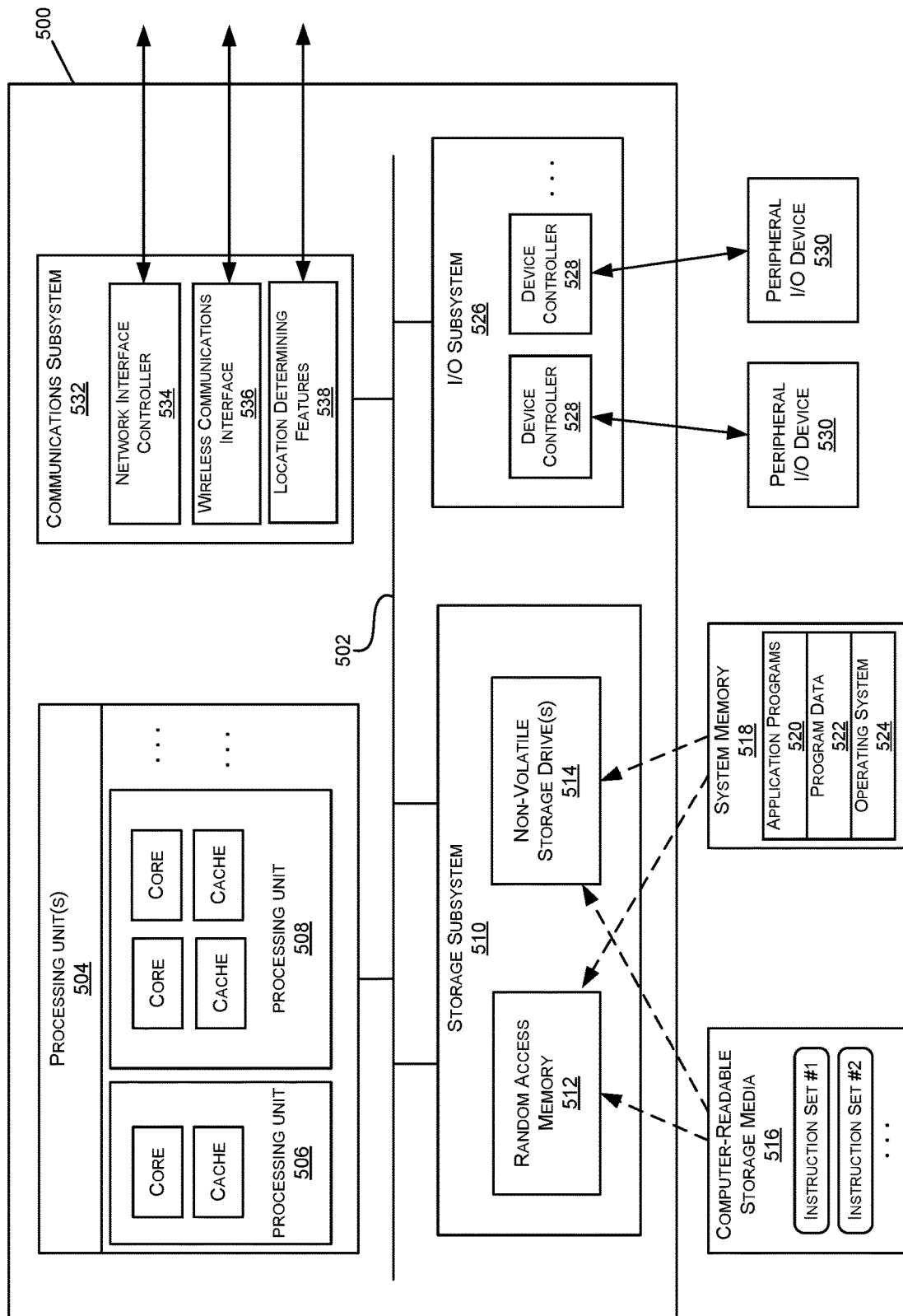
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 311). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
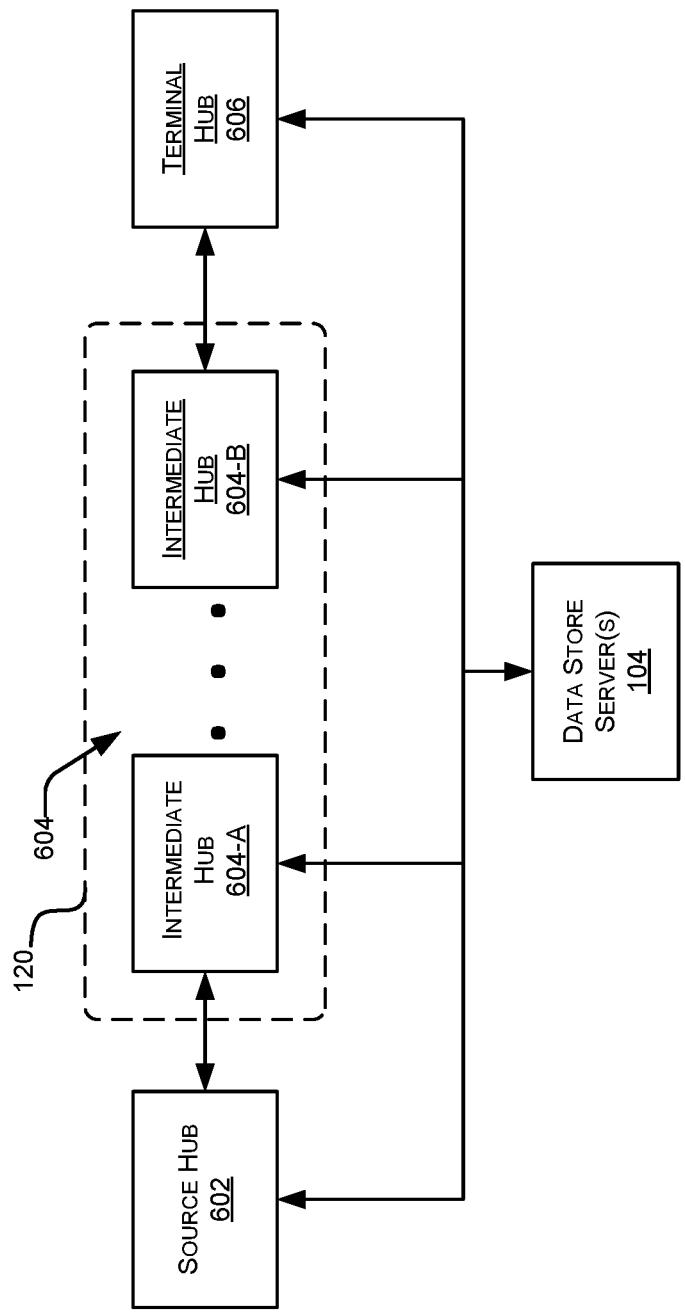
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
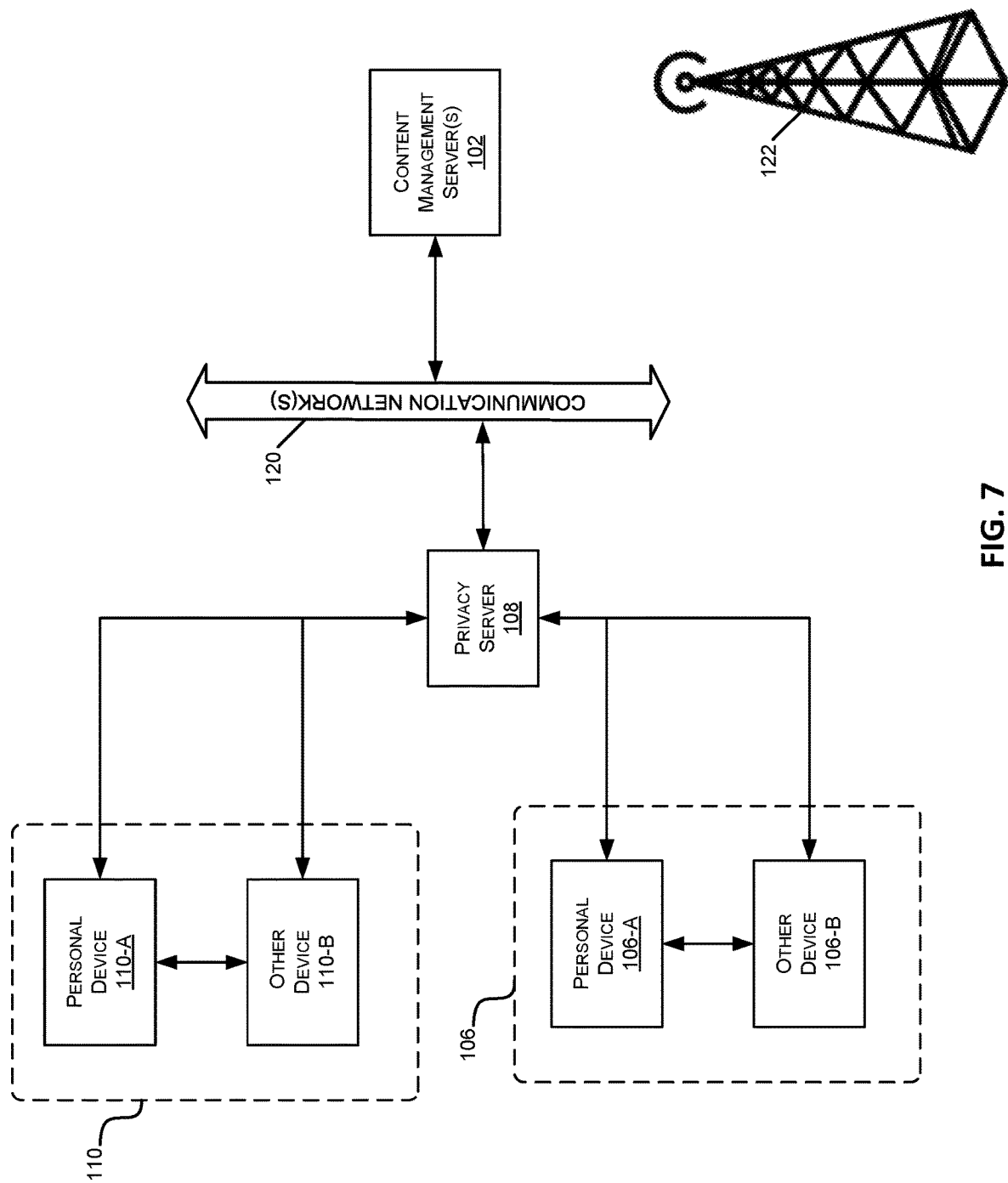
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert. In some embodiments, the prompt can comprise an alert configured to trigger activation of the I/O subsystem of a user device 106 of a follow-up user, also referred to herein as a second user device, to provide a notification of the exceeded threshold In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

In some embodiments, all or portions of the CDN 100 can be used to provide an adaptive and/or dynamic classroom. In such an embodiment, students may not have access to technology, and thus a fully adaptive system and learning experience cannot be created. Rather, teacher technology can be leveraged to create adaptivity and specifically to customize learning, to identify misconceptions and/or knowledge gaps, and to recommend content and/or activity to remediate these misconceptions and/or knowledge gaps. In some embodiments, this can be performed with the supervisor device 110 that can, occasionally interact with back end components such as the server 102, the database server 104, or the like. In some embodiments, the CDN 100 and/or components thereof can be used to create a learning plan, also referred to herein as a content creation plan, that can guide a content presenter through teaching and/or presenting certain content.

This learning plan can include evaluation of prerequisite skills and/or concepts to the skills and/or concepts that are desired to be taught and/or conveyed by the learning plan. In some embodiments, these prerequisite skills and/or concepts can be evaluated via one or several questions presented in an initial phase of the content presentation plan. If misconceptions and/or knowledge gaps in the prerequisite skills and/or concepts are identified, these can be targeted for remediation. In some embodiments, this targeting can be immediate in the form of a change in the content presentation plan, and in some embodiments, this targeting can occur when a plan break is reached such as, for example, when a break in the content presentation plan is reached. In some embodiments, this remediation can include the generation of one or several groups of students having similar misconceptions and the providing of remedial content to these students.

In some embodiments, portions of the CDN can be configured to rapidly receive non-technology based responses and convert them into electronic form. In some embodiments, this can be achieved via the use of a camera on the supervisor device to generate an image of the class while students are providing a response. Student responses can be identified from the image and associated with the student providing the response such that each student is identified and their response is captured and stored.

The supervisor device 110 can, in some embodiments, contain the entire content presentation plan, and all of the potential questions and/or remedial content. In some embodiments, this can facilitate operation in a low technology environment, and specifically in an environment lacking persistent internet connectivity. Specifically, in some embodiments, the supervisor device 110 can connect with the server 102 and/or the database server 104 during the creation of the content presentation plan. When the content presentation plan is completed, the entire content presentation plan and associated content, including remedial content can be loaded onto and/or stored on the supervisor device. During the presentation of the content presentation plan, the supervisor device 110 can operate independent of the server 102 and/or the database server 104.

Figure 8:
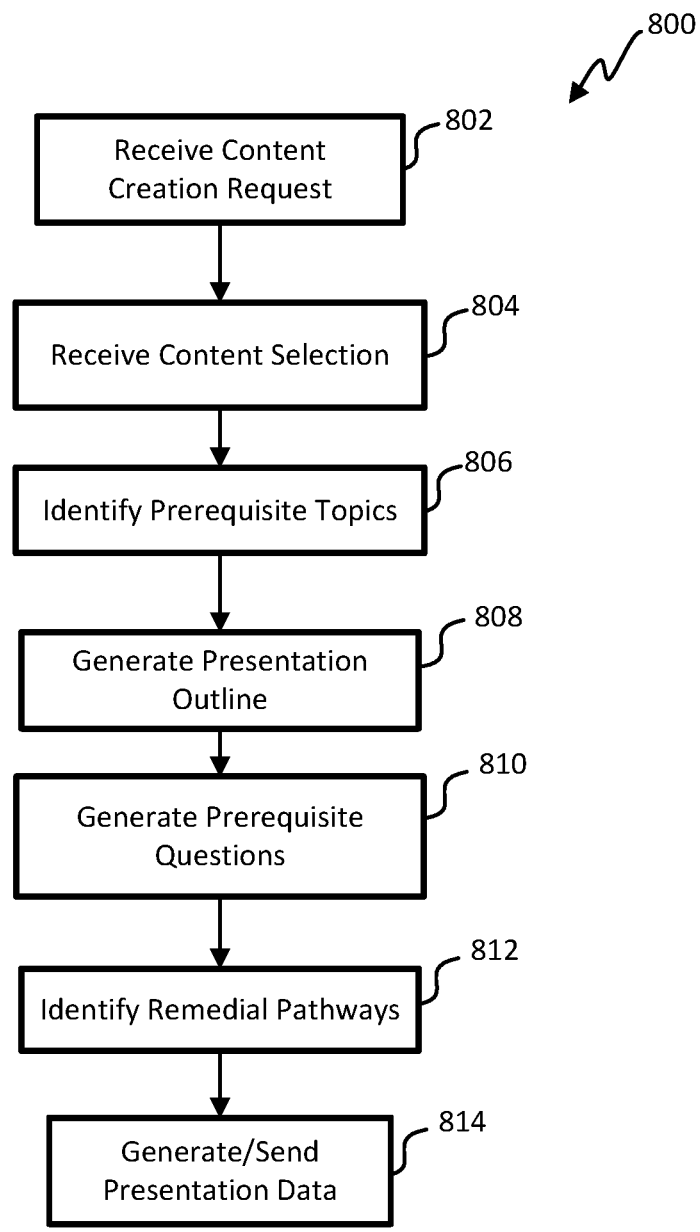
FIG. 8 is a flowchart illustrating one embodiment of a process for content presentation plan creation.

With reference now to FIG. 8, a flowchart illustrating one embodiment of a process 800 for content presentation plan creation, including the creation of one or several lessons or lesson plans, is shown. In some embodiments, content presentation plan creation can occur at a topic level. In such an embodiment, a topic plan can comprise a plurality of lessons that can, for example, relate to the same or similar learning outcome. In some embodiments, for example, each of the plurality of lessons can comprise subject matter intended for presentation in a discrete session such as, for example, in a single class period conducted in a single day. In such an embodiment, the topic plan can comprise a plurality of lessons that can be sequentially provided to a class by the content presenter over a series of class periods or days to achieve the therewith associated learning outcome. In some embodiments, the content presentation plan creation of process 800 can include planning a series of lessons, as well as planning a single lesson.

In some embodiments, the process 800 can be performed without regard to previous interactions between the teacher and/or the students and the CDN 100, and in some embodiments, the process 800 can be performed with reference to data gathered from one or several previous interactions between the teacher and/or students and the CDN 100. In some embodiments, for example, data indicative of one or several skill levels of the students, one or several learning styles, or the like can be used in the process 800 and can particularly influence content presented to the content presenter for inclusion in a content presentation plan and/or in one or several lessons or lesson plans.

The process 800 can be performed by all or part of the CDN 100. In some embodiments, the process 800 can be performed by a supervisor device 110 based on inputs received from the supervisor. The supervisor device 110 can send information to other components of the CDN 100 such as the server 102, and can receive response to that sent information. The process 800 begins at block 802 wherein a content creation request is received. This content creation request can specify, in some embodiments, creation of a content presentation plan including, for example, a single lesson, a single lesson plan, a topic plan, a plurality of lessons, a plurality of lesson plans, or the like.

In some embodiments, the content creation request can be received by the supervisor device 110 from the user of the supervisor device via the I/O subsystem 526 of the supervisor device 110. In some embodiments, the content creation request can specify a desire and/or intent to create content including, for example, the desire to create one or several lessons and/or lesson plans. In some embodiments, the receipt of the content creation request can trigger a change in a user interface displayed to the user. In some embodiments, for example, after receipt of the content creation request, the user interface can display one or several fields for identifying content for creation, for naming of the created content, for selecting content for use in the creation of the topic plan, the one or several lessons or lesson plans, the one or several content presentation plans, or the like.

After the content creation request has been received, the process 800 proceeds to block 804, wherein a content selection is received. In some embodiments, the receipt of the content selection can include the presentation of content to the content presenter for selection. In some embodiments, for example, content can be identified for presentation to the content presenter for potential selection based on one or several previous interactions between the teacher and/or students with the system 100, and particularly based on data gathered as part of one or several previously presented lessons or lesson plans. In some embodiments, for example, content having a difficulty level corresponding to a student skill level can be identified for presentation.

In embodiments in which a plurality of lessons or lesson plans are being created, the content selection can comprise the selection of one or several lessons, which selected lessons can be pre-existing lessons. In some embodiments, the receipt of the content selection can include the identification of one or several data packets or pieces of content for inclusion in one or several lessons or content presentation plans. In some embodiments, for example, this can include receipt of information identifying and/or selecting one or several learning objectives for inclusion in the content presentation plan. In some embodiments, the content selection can identify one or several nodes of the content network for inclusion in the content presentation plan. In some embodiments, the content selection can be received by the supervisor device 110 via the I/O subsystem 526.

After the content selection has been received, the process 800 proceeds to block 806, wherein one or several prerequisite topics are identified. In some embodiments, these one or several prerequisite topics can be identified based on the object network stored in the database server 104, and specifically in the content library database 303. In some embodiments, for example, the identification of prerequisite topics can include the querying of the content library database 303 for one or several prerequisite nodes to the nodes and/or learning objectives selected in block 804.

After the prerequisite topics have been identified, the process 800 proceeds to block 808, wherein a presentation outline is generated. In some embodiments, the presentation outline can comprise one or several block for inclusion of content. In some embodiments, the presentation outline can identify one or several steps that can be performed as part of a learning cycle including, for example, an introduction introduction phase which introduces a new topic through activating prior knowledge, creating curiosity in the new topic, establishing for learners an idea of objectives and introducing the learning objectives for the topic. Other phases of the learning cycle would include explain, embedding, practicing, applying, reflecting and summarizing.

After the presentation outline has been generated, the process 800 proceeds to block 810, wherein one or several prerequisite questions and/or activities are selected and/or generated. In some embodiments, this can include, for example, selecting and/or generating questions and/or activities to identify any preexisting misconceptions relating to the prerequisite topics identified in block 806. In some embodiments, for example, one or more questions can be generated for each prerequisite topic identified in block 806.

After the prerequisite questions and/or activities have been identified and/or generated, the process 800 proceeds to block 812, wherein one or several remedial pathways are identified. In some embodiments, this can include, for example, the identification of remedial content and/or actions and/or an order for presentation of remedial content and/or actions. In some embodiments, for example, a remedial pathway can be identified for some or all of the misconceptions identified by the questions generated in block 810. In such an embodiment, for example, the remedial pathway can include content such that the user, upon completion of the remedial pathway, has resolved the misconception giving rise to the remediation.

After the remedial pathway has been identified, the process 800 proceeds to block 814, wherein the presentation data is generated and/or sent. In some embodiments, for example, this can include the compilation of the content presentation plan based on the selected content, the prerequisite topics, the generated prerequisite questions, the presentation outline, and the remedial pathways. In some embodiments, this information can be compiled and can be sent to and/or stored on the supervisor device 110.

Figure 9:
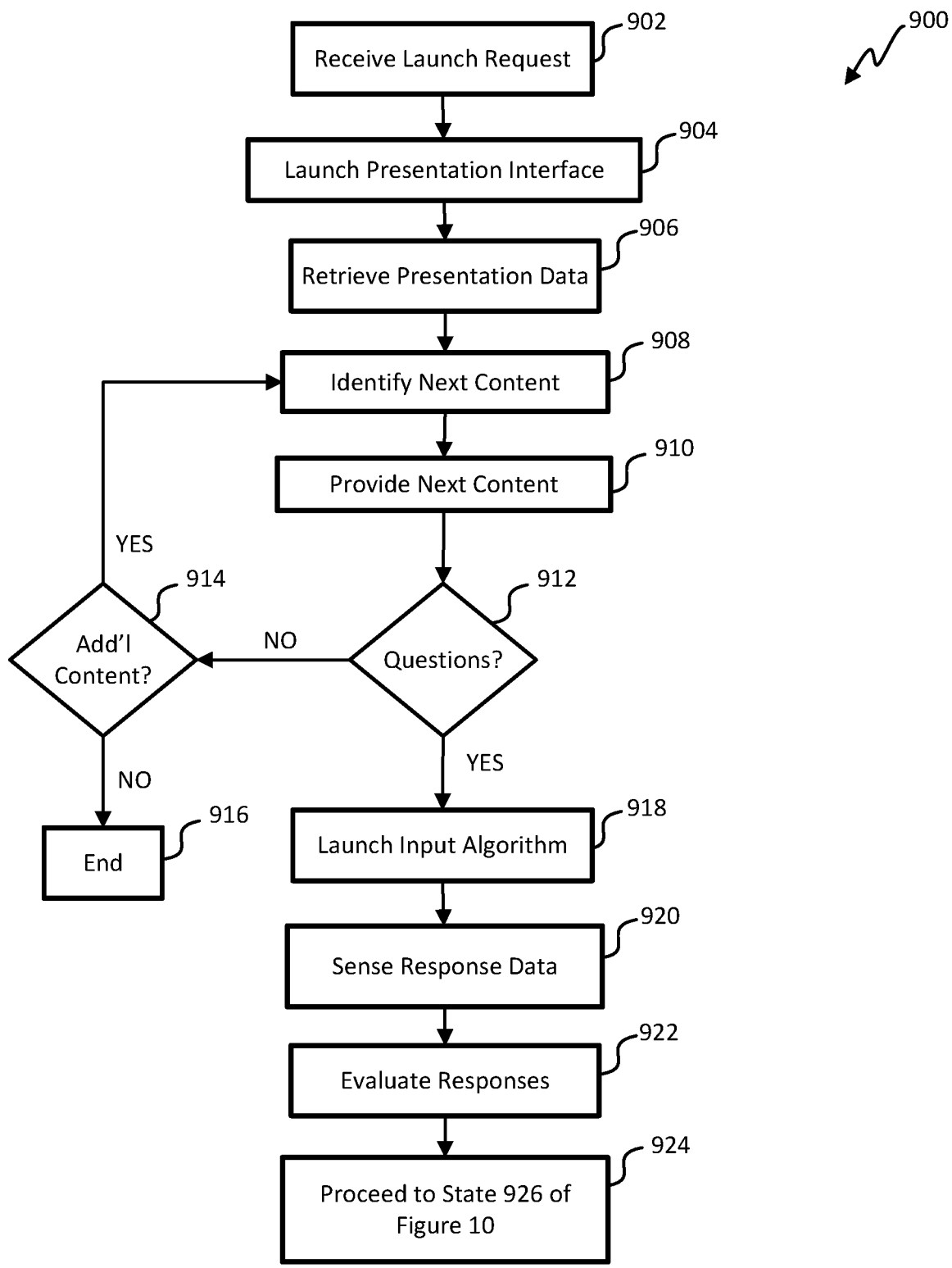
FIG. 9 is a flowchart illustrating a first part one embodiment of a process for providing an adaptive classroom environment.
Figure 10:
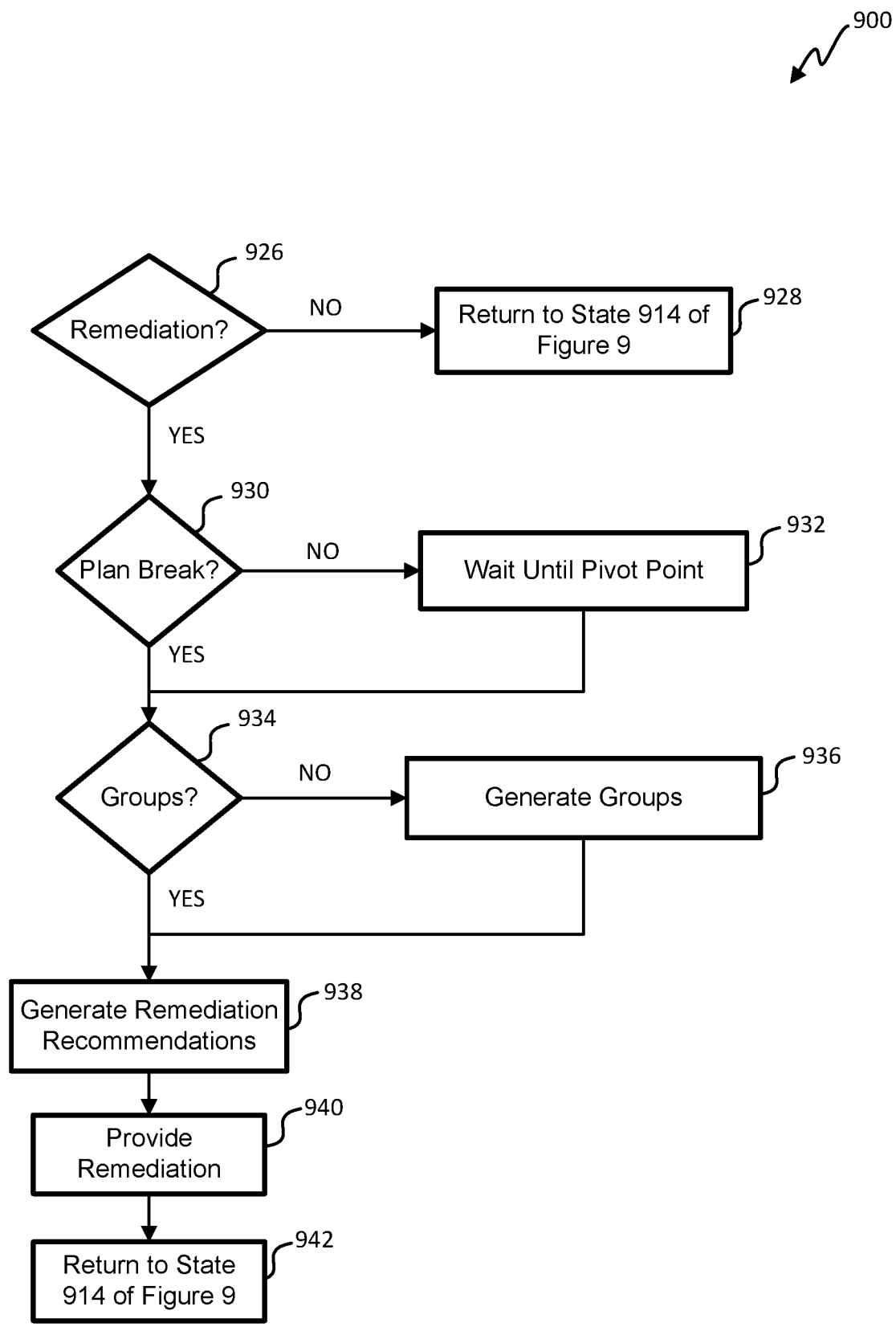
FIG. 10 is a flowchart illustrating a second part one embodiment of a process for providing an adaptive classroom environment.

With reference now to FIGS. 9 and 10, a flowchart illustrating one embodiment of a process 900 for providing an adaptive classroom environment is shown. In some embodiments, the process 900 can be performed by a content presenter using a supervisor device 110 for students in the content presenter's class. The process 900 can include the presentation of content, the identification of one or several misconceptions, and the remediation of those misconceptions. In some embodiments, content can be presented in one or several phases including, for example, an explain phase, an embed phase, a practice phase, and an apply phase, In some embodiments, in the explain phase, content corresponding to new content is provided, and in some embodiments the explain phase can include the presentation of content corresponding to knowledge, including conceptual and procedural information, to successfully completed the embed phase. In some embodiments, the embed phase can include content to quickly ascertain student understanding of conceptual and procedural information provided in the explain phase, and specifically to only ascertain student understanding of conceptual and procedural information provided in the explain stage.

In the practice phase, content, including one or several questions or tasks, is provided to the user to ascertain mastery of content provided in the explain and embed phases as well as ascertain student understanding of content and/or concepts including the content and/or concepts of the explain and embed phases. Thus, in some embodiments, the content and/or concepts of the explain and embed phases can build upon previously provided content and/or concepts. The practice phase includes one or several questions or tasks to ascertain student understanding of the entire set of previously provided content and/or concepts as well as content and/or concepts from the explain and embed phases. In some embodiments, the explain, embed, and practice phases can be iteratively applied until the students have achieved a desired mastery of the content and/or concepts of one or several: lessons; lesson plans; task plans; or the like.

The apply phase can follow completion of some or all of the iterations of the explain, embed, and practice phases. In some embodiments, the apply phase can comprise providing one or several questions, tasks, and/or rich tasks to the students, receiving responses from the students, and identifying any potential remediation based on these responses. In some embodiments, and as used herein, a rich task can comprise one or several open ended questions that can be solved and/or addressed via the application of multiple solution techniques or methodologies. In some embodiments, the rich task allows identification of a student location in a learner progression and enables identification of one or several misconceptions for remediation. In some embodiments, the apply phase further includes the identification of one or several misconceptions and the providing of remedial content. In some embodiments, the effectiveness of the remedial content can be ascertained via one or several activities that can prompt the student to create something based on gained knowledge.

The process 900 can be performed by all or portions of the CDN 100 including, for example, the supervisor device 110. In some embodiments, the supervisor device 110 can work in connection with user devices 106, and in some embodiments, the supervisor device 110 can perform process 900 without interaction with user devices. The process 900 begins at block 902, wherein a launch request is received. In some embodiments, the launch request is received by the supervisor device 110 from the user of the supervisor device 110. Specifically, in some embodiments, the launch request is received by the supervisor device 110 via the I/O subsystem 526.

After the launch request has been received, the process 900 proceeds to block 904, wherein a presentation interface is launched. In some embodiments, the presentation interface is a user interface that can provide the content presentation plan to the user of the supervisor device 110. The presentation interface can include one or several windows or panels configured to display information such as portions of the content presentation plan, for example a topic, a lesson or a specific activity or portion of the learning cycle and one or several windows or panels configured to receive inputs. The presentation interface can be launched by the I/O subsystem 526 of the supervisor device 110.

After the presentation interface has been launched, the process 900 proceeds to block 906, wherein presentation data is retrieved. In some embodiments, the presentation data can comprise the content presentation plan. In some embodiments, the presentation data can be retrieved from the database server 104, and specifically from the content library database 303. In some embodiments, the content presentation plan can be locally stored on memory of the supervisor device 110 and can be retrieved from that memory.

After the presentation data has been retrieved, the process 900 proceeds to block 908, wherein next content is identified. In some embodiments, the next content can be the next content to be presented as part of the content presentation plan. In embodiments in which the content presentation plan is being launched, the next content can be the first content of the content presentation plan, whereas in embodiments in which the content presentation plan is already underway, the next content can be selected from any unpresented content of the content presentation plan. In embodiments in which the content presentation plan comprises sequenced content, the next content can be the next content in the sequence of the content presentation plan.

After the next content has been selected, the process 900 proceeds to block 910, wherein the next content is provided. In some embodiments, this can include the display of the next content to the user via the supervisor device 110, and specifically via the I/O subsystem 526 of the supervisor device 110.

After the next content has been provided, the process 900 proceeds to decision state 912, wherein it is determined if the provided next content was a question and/or activity such as, for example, an activity in the practice or the apply phases. If the provided next content was not a question, then the process 900 proceeds to decision state 914, wherein it is determined if there is additional content in the content presentation plan. If there is additional content, then the process 900 returns to block 908 and proceeds as outlined above. If it is determined that there is no additional content, then the process 900 proceeds to block 916 and terminates. In some embodiments, and as part of the termination of the process 900, one or several suggestions, modification, and/or remediations can be provided to the user of the supervisor device 110.

Returning again to decision state 912, if it is determined that the provided next content is a question, then the process 900 proceeds to block 918, wherein the input algorithm is launched. In some embodiments, the input algorithm can comprise an algorithm configured to receive inputs from student recipients of the content of the content presentation plan. In some embodiments, these inputs can be provided by the students in response to the question. In some embodiments, the input algorithm can be launched by the supervisor device 110.

After the input algorithm has been launched, the process 900 proceeds to block 920, wherein response data is sensed. In some embodiments, the response data can be sensed and/or received by one or several features, also referred to herein as sensors, of the supervisor device 110 such as, for example, a camera, a microphone, a touchscreen, or the like. After the response data has been sensed, the process 900 proceeds to block 922, wherein the received responses are evaluated. In some embodiments, this can include determining whether one or several of the received responses are correct or incorrect. The evaluation of the received responses can be performed by the supervisor device 110.

After the responses have been evaluated, the process 900 proceeds to block 924 and continues with decision state 926 of FIG. 10, wherein it is determined whether a remediation, or alternatively deeper learning is desired. In some embodiments, this determination can be made based on the results of the evaluation of the received responses performed in block 922. In some embodiments, for example, a remediation can be triggered when one or several received responses are incorrect, when more than a threshold number or threshold percent of responses are incorrect, or the like. In some embodiments, deeper learning can be triggered when some or all of the received responses are correct, when more than a threshold number or threshold percent of the responses are correct, or the like. If it is determined that no remediation and/or deeper learning is required, then the process 900 moves to block 928 and moves to state 914 of FIG. 9.

If it is determined that a remediation and/or deeper learning is desired, then the process 900 proceeds to decision state 930, wherein it is determined if a plan break is reached. In some embodiments, the plan break can comprise a break in the content presentation plan that can enable an intervention. Some examples of the plan break include, the end of a part of the content presentation plan, the end of a time period such as, for example, the end of a course period, the end of the day, or the like, or the receipt of a plan break indicator such as, for example, if the user of the supervisor device 110 provides an input indicating reaching a plan break.

If it is determined that a pivot pint has not been reached, then the process 900 proceeds to block 932 and waits until a plan break has been reached. If it is determined that a plan break has been reached, or after the process 900 has waited until a plan break has been identified, the process 900 proceeds to block 934, wherein it is determined whether to divide the students in the class into groups. In some embodiments, for example, different students may be identified as needing different interventions. In such an embodiment, dividing the students into groups can facilitate better matching of interventions with students. In some embodiments, the determination of whether to divide the students into groups can include determining whether different remediations are called for in the class.

If it is determined to divide the students into groups, the process 900 proceeds to block 936, wherein one or several groups, also referred to herein as remediation cohorts, are generated. In some embodiments, these groups can be generated such that students needing similar interventions are grouped together. The groups can be generated by the supervisor device 110. After the groups are generated, or returning again to decision state 934, if it is determined that groups are not needed, the process 900 proceeds to block 938, wherein a recommendation, which can include one or both of a remediation recommendation and a deeper learning recommendation, is generated. In some embodiments, the remediation recommendation can include identify one or several actions such as changes to the content presentation plan, content for providing to the students in the class, or the like. The remediation recommendation can be generated by the supervisor device.

After the remediation recommendation has been generated, the process 900 proceeds to block 940, wherein the remediation is provided. In some embodiments, the remediation can be provided to the user of the supervisor device 110 via the I/O subsystem 526 of the supervisor device 110. After the remediation recommendation has been generated, the process 900 proceeds to block 942, and continues to decision state 914 of FIG. 9.

Figure 11:
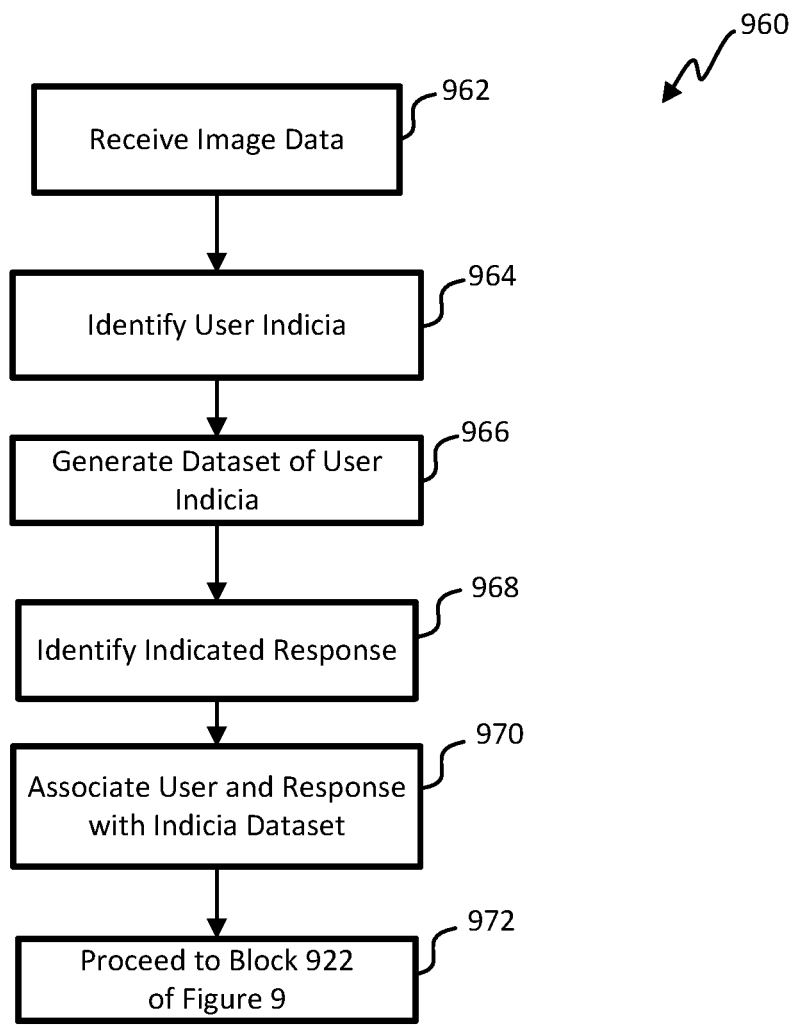
FIG. 11 is a flowchart illustrating one embodiment of a process for sensing response data.

With reference now to FIG. 11, a flowchart illustrating one embodiment of a process 960 for sensing response data is shown. In some embodiments, the process 960 can be performed as a part of, or in the place of the step of block 920 of process 900. The process 960 can be performed by the supervisor device 110. The process 960 begins at block 962, wherein image data is received. In some embodiments, the image data can be received by the supervisor device 110 from the camera of the supervisor device 110, which camera can be an input device 530 of the I/O subsystem 526. In some embodiments, the image data can be generated in response to a received user input commanding the generation of the image data.

Figure 12:
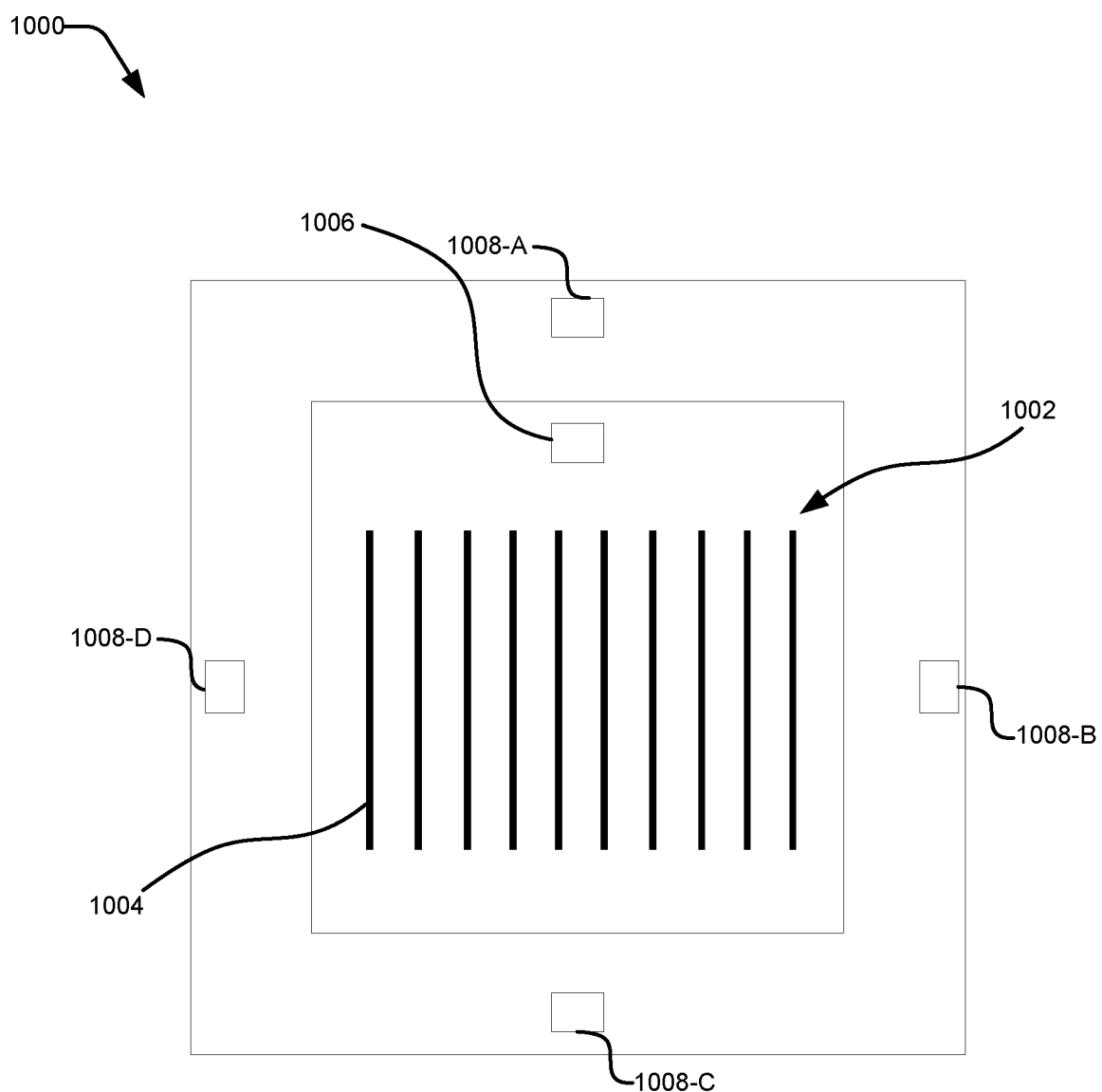
FIG. 12 is a schematic illustration of one embodiment of a user card.

After the image data has been received, the process 960 proceeds to block 964, wherein users in the image data are identified. In some embodiments, this can include, for example, identifying one or several physical user attributes, identifying a user code, identifying a user card, or the like. In some embodiments, for example, the supervisor device 110 can be configured for facial recognition so as to identify users in the generated image data. In some embodiments, users can be provided with a user card 1000 as shown in FIG. 12.

The user card 1000 can include an identifier region 1002 that can include, for example, a user identifier 1004. In some embodiments, the user identifier 1004 can comprise a computer readable code such as, for example, a bar code, a QR code, or the like. In some embodiments, the user identifier 1004 can comprise text, characters, a text and/or character string, or the like. The user card 1000 can, in some embodiments, include one or several orientation features 1006 and one or several response indicia 1008. In some embodiments, the one or several orientation features 1006 can be integrated into other components of the user card 1000 such as, for example, the user identifier 1004 and/or the response indicia 1008, whereas in other embodiments, the one or several orientation features can be separate and/or distinct from the other components of the user card.

In some embodiments, the response indicia 1008 can facilitate in the user providing a response via the holding of the user card 1000 in a desired orientation. In one embodiment, for example, the user card 1000 can include a first response indicia 1008-A, a second response indicia 1008-B, a third response indicia 1008-C, and a fourth response indicia 1008-D. In such an embodiment, the user card 1000 can be used to provide a response to one or several true/false and/or multiple choice questions. In such an embodiment, the user card 1000 can be held in a specified orientation to indicate selection of one of the response indicia 1008 as the answer. Thus, in one embodiment in which the first response indicia 1008-A is the desired answer, the user card 1000 can be held, for example, so that the first response indicia 1008-A is on top of the user card 1000.

Returning again to block 964 of FIG. 11, in some embodiments, the identification of the user indicia can include the identification of one or several user cards 1000 in the image data generated in block 962, and the reading of the user identifier 1004 of the user cards 1000. In some embodiments, after the user indicia have been identified in the image data, the user indicia can be extracted from the image data.

After the user indicia have been identified, the process 960 proceeds to block 966, wherein a dataset of the user indicia is generated. In some embodiments, this dataset can include all of the user indicia identified in the image data of block 962 and, in some embodiments, the students associated with those identified user indicia. In some embodiments, the dataset can be generated by retrieving information associating students with user indicia from the memory of the supervisor device 110.

After the dataset of user indicia is generated, the process 900 proceeds to block 968, wherein a user response is identified. In some embodiments, the user response can be identified from the image data received in block 962. The user response can, in some embodiments, be identified by determining the orientation of the user cards 1000 in the image, by determining one or several gestures made by students and captured in the image data, or the like. In some embodiments in which the user response is determined by identifying the orientation of the user card 1000, the orientation of the user card 1000 can be determined by determining the location of the one or several orientation features 1006 with respect to each other and/or with respect to other parts of the user card 1000 such as, for example, the user identifier 1004. In some embodiments, after the response has been identified in the image data, the response can be extracted from the image data.

After the indicated response has been identified, the process 960 proceeds to block 970, wherein user associated with the response is identified, and wherein the user and the response as linked in the indicia data set. In some embodiments, this can include updating the dataset to include response data. In some embodiments, a response can be identified for each student identified in the image data and/or for each user indicia identified in the image data. In some embodiments in which a response is not identified for a student and/or for a student indicia, an alert can be generated for the student and/or for the student indicia prompting the teacher to take action to receive a response for that student and/or for the user indicia. After the user and the responses have been linked in the dataset, the process 960 proceeds to block 972, and continues with block 922 of FIG. 9.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for automatic generation of a content delivery framework, the system comprising:
   memory comprising: a plurality of objectives; and objective information for the plurality of objectives;
   a user device, comprising at least one processor, configured to:
      receive at the processor content identification information, wherein the content identification information identifies one or several objectives for inclusion in a content presentation plan;
      retrieve objective information for the one or several objectives identified for inclusion in a content presentation plan from the memory;
      identify at least one prerequisite skill for completion of the one or several objectives, wherein the at least one prerequisite skill is identified in the objective information of the at least one objectives;
      download a plurality of remediation questions configured to delineate between users having mastery of the at least one prerequisite skill and users not having mastery of the at least one prerequisite skill;
      pre-select and download remedial content for providing to users identified as not having mastery of the at least one prerequisite skill, wherein each of the plurality of remediation questions is associated with a unique remedial content;
      select and download objective content corresponding to the at least one objectives wherein the content corresponding to the at least one objective comprises multiple packets of presentation content and multiple packets of assessment content;
      create a content presentation plan containing the plurality of remediation questions, the remedial content, and the objective content, wherein the content presentation plan comprises code configured to deliver the plurality of remediation questions, deliver a unique remedial content when an associated remediation question in the plurality of remediation questions is incorrectly answered and iteratively deliver the objective content subsequent to the delivery of the remediation question;
      receive a launch request;
      launch a presentation interface, wherein the presentation interface comprises a user interface configured to provide the content presentation plan;
      retrieve presentation data from the memory;
      identify next content from the content presentation plan;
      provide the identified next content to a user via the presentation interface;
      determine a presence of a plan break, wherein when the presence the plan break is determined, the at least one processor is configured to:
         generate a remediation;
         generate at least one remediation cohort; and
         deliver the generated remediation to the remediation cohort; and
   a sensor coupled with the at least one processor, wherein the at least one processor is further configured to:
      sense response data with the sensor;
      evaluate sense response data; and
      determine to provide a remediation.

2. A method for automatic generation of a content presentation plan, the method comprising:
   receiving at a user device content identification information, wherein the content identification information identifies one or several objectives for inclusion in a content presentation plan;
   retrieving objective information for the one or several objectives identified for inclusion in a content presentation plan from a database server, wherein the database server comprises objective information for a plurality of the objectives;
   identifying at least one prerequisite skill for completion of at least one of the one or several objectives, wherein the at least one prerequisite skill is identified in the objective information of the at least one of the one or several objectives;
   downloading a plurality of remediation questions configured to delineate between users having mastery of the at least one prerequisite skill and users not having mastery of the at least one prerequisite skill, wherein each remediation question in the plurality of remediation questions is associated with unique remedial content;
   pre-selecting and downloading remedial content for providing to users identified as not having mastery of the at least one prerequisite skill;
   selecting and downloading objective content corresponding to the at least one objectives, wherein the content corresponding to the at least one objectives comprises multiple packets of presentation content and multiple packets of assessment content;

creating a content presentation plan containing the plurality of remediation questions, the remedial content, and the objective content, wherein the content presentation plan comprises code configured to deliver associated and unique remediation content when a remediation question in the plurality of remediation questions is incorrectly answered, and iteratively deliver the objective content subsequent to the delivery of the remediation question;

receiving a launch request;

launching a presentation interface, wherein the presentation interface comprises a user interface configured to provide the content presentation plan;

retrieving presentation data from the memory;

identifying next content from the content presentation plan;

providing the identified next content to a user via the presentation interface;

sensing response data with a sensor of the user device;

evaluating sense response data;

determining to provide a remediation; and determining presence of a plan break, wherein when presence of the plan break is determined:
  generating a remediation;
  generating at least one remediation cohort; and
  delivering the generated remediation to the remediation cohort.

* * * * *